United States Patent
Barrass et al.

(10) Patent No.: US 7,415,062 B1
(45) Date of Patent: Aug. 19, 2008

(54) SWITCHING SYSTEM SUPPORTING DATA COMMUNICATIONS SUPPORTED BY MULTIPLE POWER SPECTRA

(75) Inventors: Hugh Barrass, Milpitas, CA (US);
Brian A. Arnold, Pescadero, CA (US);
David A. Schwartz, Palo Alto, CA (US);
Joseph A. Shiran, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1424 days.

(21) Appl. No.: 09/964,150

(22) Filed: Sep. 25, 2001

(51) Int. Cl.
*H04B 1/38* (2006.01)

(52) U.S. Cl. ..................... 375/222; 375/295

(58) Field of Classification Search ............ 375/222, 375/211, 219, 229, 230, 232, 260, 285, 295, 375/296, 350; 370/464, 468, 469, 480, 481, 370/208, 278, 493, 467, 280; 379/7–35
See application file for complete search history.

(56) References Cited

U.S. PATENT DOCUMENTS

| | | | | |
|---|---|---|---|---|
| 6,088,368 | A * | 7/2000 | Rubinstain et al. ......... 370/480 |
| 6,243,413 | B1 | 6/2001 | Beukema .................... 375/222 |
| 6,449,261 | B1 * | 9/2002 | Humphrey ................ 370/280 |
| 6,587,476 | B1 * | 7/2003 | Lewin et al. ............... 370/467 |
| 6,775,355 | B1 * | 8/2004 | Bingel et al. ................. 379/7 |
| 6,813,476 | B1 | 11/2004 | Brooker ..................... 455/10 |
| 6,829,252 | B1 * | 12/2004 | Lewin et al. ............... 370/493 |
| 6,845,082 | B2 | 1/2005 | Bourget et al. ............ 370/210 |
| 6,862,261 | B2 * | 3/2005 | Paik et al. .................. 370/208 |
| 6,870,879 | B2 | 3/2005 | Gazsi et al. ................. 375/229 |
| 6,895,040 | B2 | 5/2005 | Zhou ........................ 375/220 |
| 6,970,501 | B1 * | 11/2005 | Bremer et al. ............. 375/222 |
| 2001/0022777 | A1 | 9/2001 | Bourget et al. ............ 370/210 |
| 2002/0041572 | A1 * | 4/2002 | Palm ........................ 370/278 |
| 2002/0101914 | A1 * | 8/2002 | Say ........................... 375/222 |
| 2002/0172273 | A1 * | 11/2002 | Baker et al. ................ 375/222 |
| 2003/0012288 | A1 | 1/2003 | Zhou ........................ 375/260 |
| 2003/0099286 | A1 * | 5/2003 | Graziano et al. ........... 375/222 |
| 2004/0184416 | A1 | 9/2004 | Woo ......................... 370/318 |
| 2004/0258172 | A1 | 12/2004 | Zhang ....................... 375/261 |

* cited by examiner

*Primary Examiner*—David B Lugo
(74) *Attorney, Agent, or Firm*—Baker Botts L.L.P.

(57) ABSTRACT

In a particular embodiment, a system for communicating data includes a data switch coupled to one or more CPE devices. The data switch may communicate with one or more CPE devices using a first predetermined PSD and using a second predetermined PSD. The operability of the switch is provided by software embodied in a computer-readable medium. In a more particular embodiment, the data switch may also communicate substantially simultaneously with two or more CPE devices using at least two different PSDs.

20 Claims, 7 Drawing Sheets

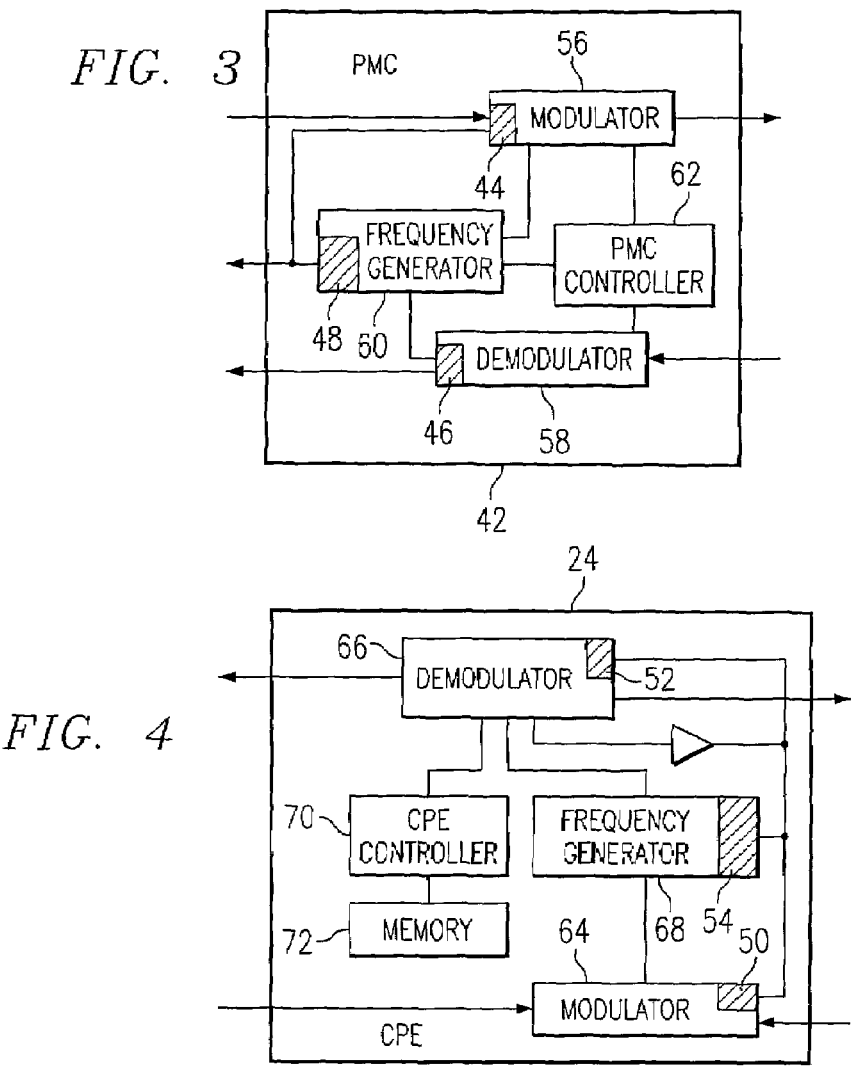
FIG. 3
FIG. 4
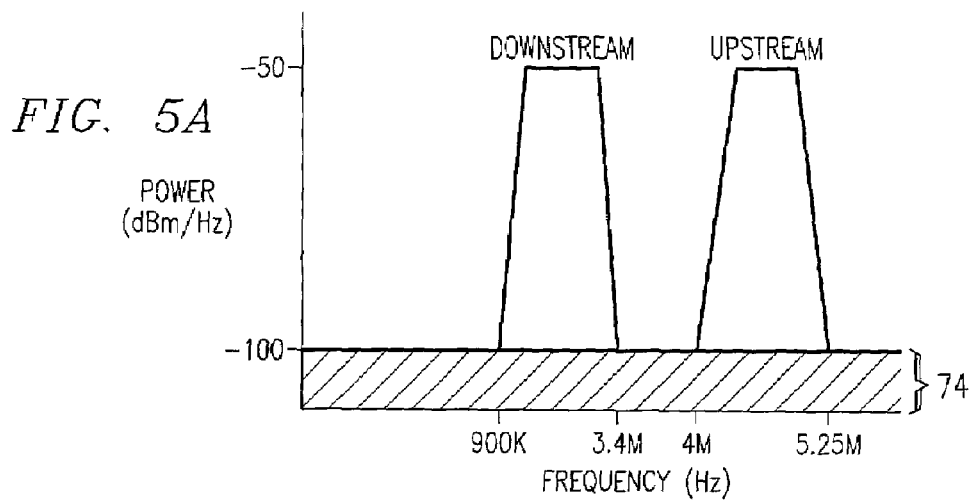
FIG. 5A

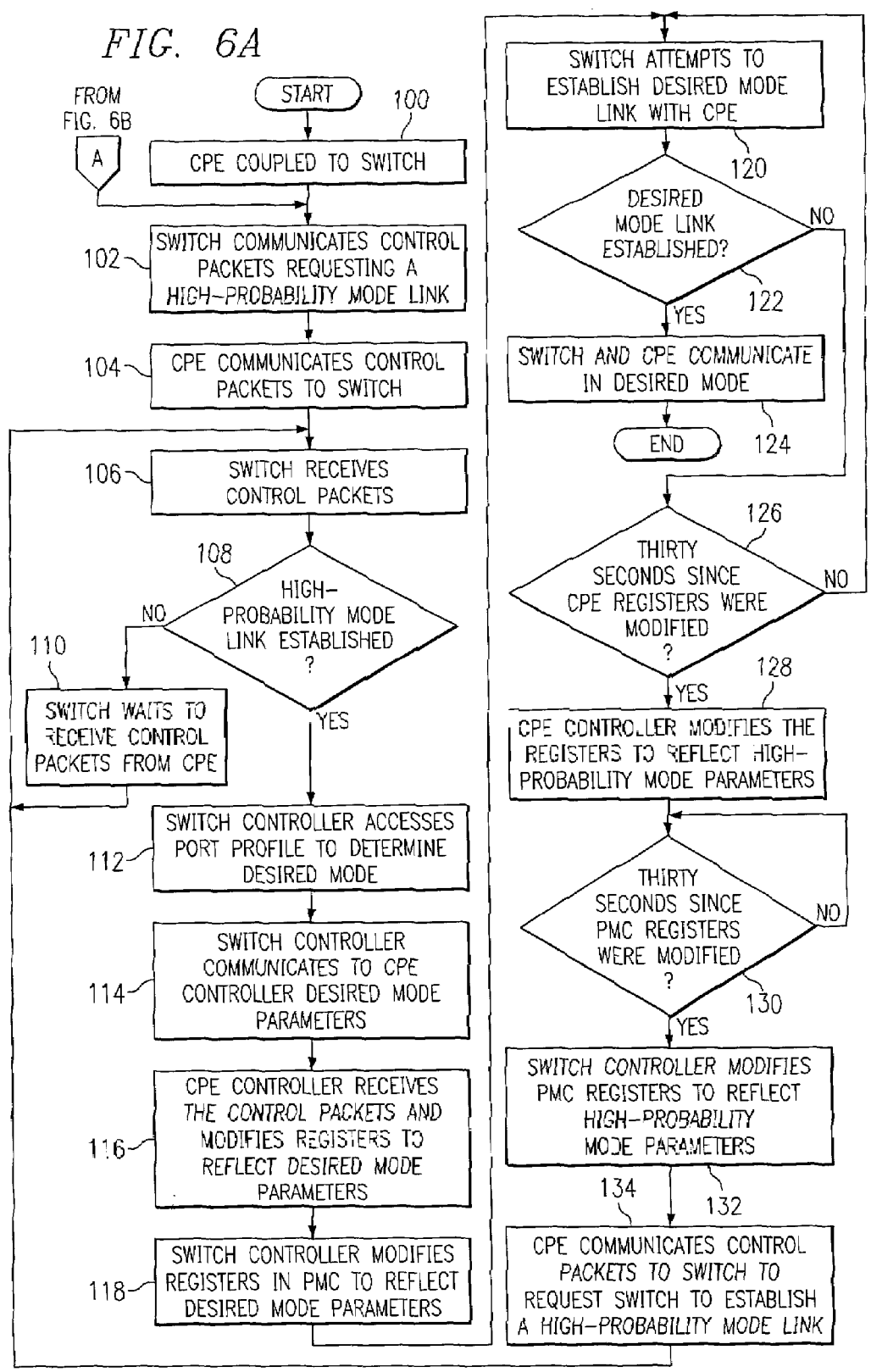

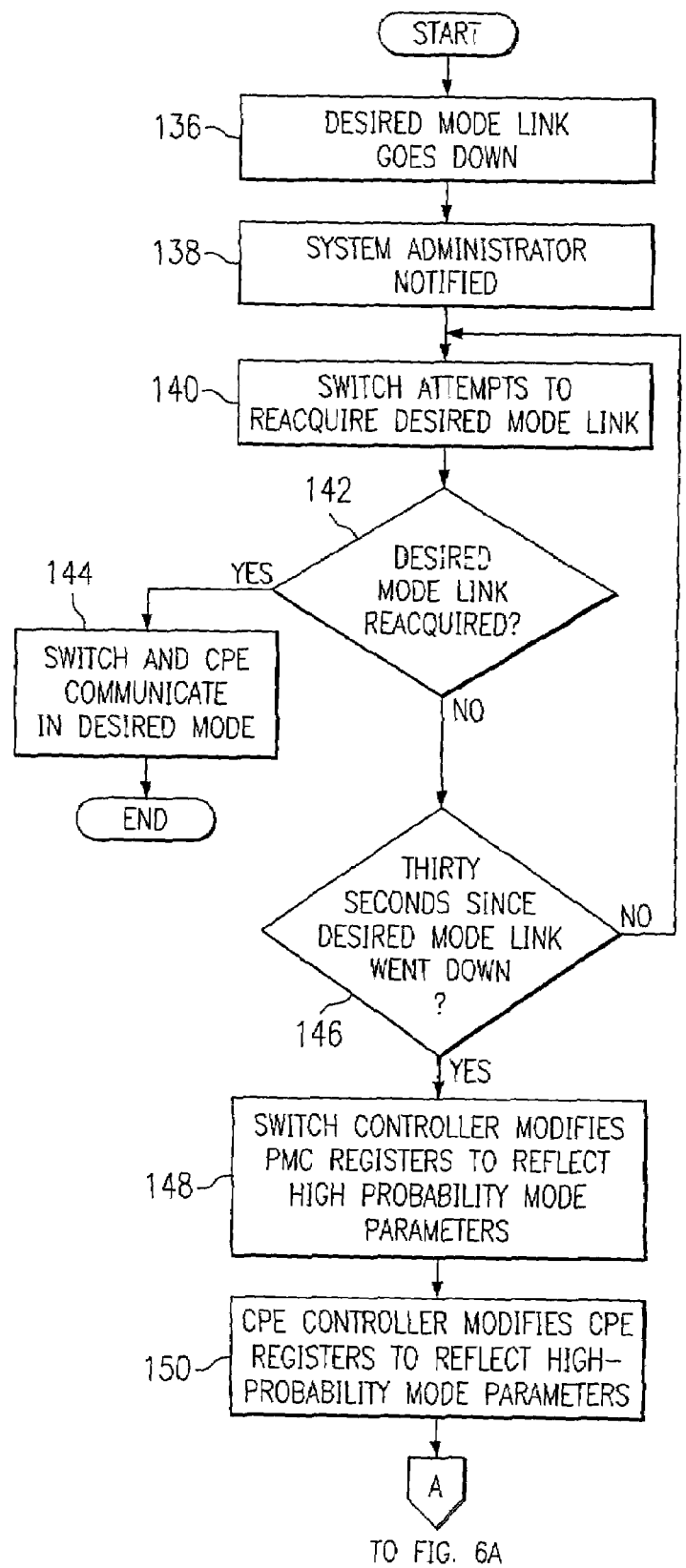

SWITCHING SYSTEM SUPPORTING DATA COMMUNICATIONS SUPPORTED BY MULTIPLE POWER SPECTRA

TECHNICAL FIELD OF THE INVENTION

This invention relates in general to the field of communications and in particular to a switching system supporting data communications supported by multiple power spectra.

BACKGROUND OF THE INVENTION

High-frequency signals transmitted on separate lines within a bundle of twisted pair copper cables may interfere with each other. The nature and degree of interference may vary depending on the nature of the cabling and the characteristics of the communication. For this reason, national and international standards and regulations may govern transmissions across trunk lines within communication networks. For example, transmissions across trunk lines within a proprietary network interfacing directly with a public switched telephone network (PSTN) may be regulated by standards adopted by the American National Standards Institute (ANSI) or the European Telecommunications Standards Institute (ETSI), depending on the location of the PSTN. It may therefore be necessary for a switch using such a network to communicate with customer premises equipment (CPE) devices within the network using a power spectral density (PSD) that complies with ANSI or ETSI standards. In contrast, transmissions across lines within a proprietary network coupled to a PSTN via a private branch exchange (PBX) may be unconstrained by such standards. Therefore, a switch supporting a network coupled to a PSTN via a PBX may be free to communicate with CPE devices within the network using a PSD that provides a higher bit rate or greater reliability than PSDs that comply with ANSI or ETSI standards.

Traditionally, field-replaceable line cards have been used to provide switches that may support communication in different spectra. However, the use of line cards has several drawbacks. For example, the use of line cards adds to costs associated with setting up and operating switches and increases the size of switch "footprints." Moreover, a single line card may support communication in only one power spectrum. Network administrators may therefore have to replace line cards supporting communication between the switch and CPE devices to effect a change in the PSD used for data communication within the network.

SUMMARY OF THE INVENTION

According to the present invention, disadvantages and problems associated with previous switching systems supporting communication in multiple power spectra are substantially reduced or eliminated.

In a particular embodiment, a system for communicating data includes a data switch coupled to one or more CPE devices. The data switch may communicate with one or more CPE devices using a first predetermined PSD and using a second predetermined PSD. The operability of the switch is provided by software embodied in a computer-readable medium. In a more particular embodiment, the data switch may also communicate substantially simultaneously with two or more CPE devices using at least two different PSDs.

The present invention provides a number of important technical advantages over previous switching systems supporting communication in multiple power spectra. A switch may support communication in multiple power spectra without the use of field-replaceable line cards, which may reduce or eliminate costs associated with line cards, decrease switch footprints, and make it easier for network administrators to change switch port configurations. In one embodiment, a switch may communicate with different CPE devices using different PSDs. This may benefit networks where the optimal PSD for communication between the switch and CPE devices varies from link to link. Moreover, the present invention may allow network administrators to define their own PSDs for communication between a switch and CPE devices, providing for even greater flexibility in communication between the switch and CPE devices within the network.

BRIEF DESCRIPTION OF THE DRAWINGS

To provide a more complete understanding of the present invention and the features and advantages thereof, reference is made to the following description, taken in conjunction with the accompanying drawings, in which:

FIG. 3 illustrates an exemplary physical media controller (PMC);

FIG. 4 illustrates an exemplary CPE device;

FIGS. 5A through 5D illustrate various PSDs for communication between switches and CPE devices; and FIGS. 6A through 6D illustrate various methods for establishing and maintaining links in desired modes.

DETAILED DESCRIPTION OF THE INVENTION

Figure 1:
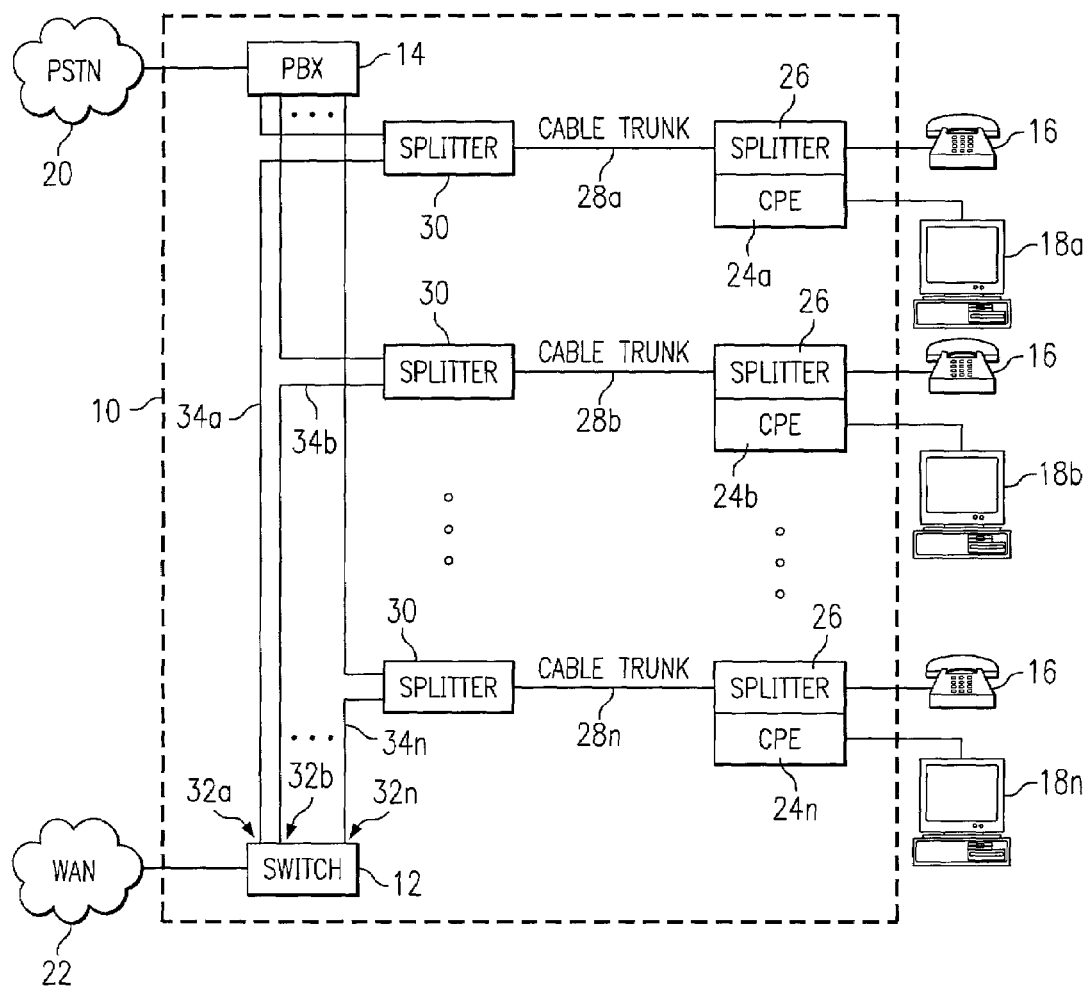
FIG. 1 illustrates an exemplary system for providing voice and data services.

FIG. 1 illustrates an exemplary system 10 for providing voice and data services. System 10 may provide voice and data services for a subscriber community, which may include one or more businesses, apartment complexes, or other communities in which subscribers share communications infrastructure or resources, such as switch 12 and PBX 14. Each subscriber in the served community may access voice and data services using one or more associated telephones 16, personal computers 18, or other suitable devices for interfacing with a telephone network, such as PSTN 20, or a data network, such as wide area network (WAN) 22.

CPE devices 24 and downstream splitters 26 couple PCs 18 and telephones 16 with cable trunks 28. Downstream splitters 26 separate downstream data traffic from downstream voice traffic for communication to PCs 18 and telephones 16, respectively, and combine upstream data traffic with upstream voice traffic for communication across cable trunks 28 to switch 12 and PBX 14, respectively. Reference to voice traffic is meant to encompass any appropriate signals that may be communicated between telephones 16 and PSTN 20, and reference to data traffic is meant to encompass any appropriate voice, video, multimedia, data, or other wideband or broadband calls, traffic, or other signals that may be communicated between WAN 22 and PCs 18. Upstream splitters 30 separate upstream data traffic from upstream voice traffic for communication to switch 10 and PBX 14, respectively, and combine downstream data traffic with downstream voice traffic for communication across trunks 28 to PCs 18 and telephones 16, respectively.

Trunks 28 provide links between downstream splitters 26 and upstream splitters 30 and may carry both voice and data traffic. Transmissions across trunks 28 may be affected by the physical characteristics of trunks 28. For example, attenuation across trunk 28 may be affected by trunk length. Typically, attenuation is greater for longer trunks than on shorter trunks. As a result, the optimal PSD for communicating data across trunk 28 may vary according to the length of trunk 28. Herein, a particular PSD used for communications between switch 12 and CPE devices 24 may be referred to as a mode, and vice versa. In an "unregulated spectra" environment, as shown in FIG. 1, transmissions across trunks 28 are not constrained by public standards, regulations, or other constraints. The interface between system 10 and PSTN 20 provided by PBX 14 may eliminate the need for compliance with standards or public regulations within system 10. Accordingly, the PSDs for transmissions across trunks 28 may vary trunk-to-trunk and may be set by a system administrator to optimize the transmission of data across trunks 28. In a "regulated spectra" environment, transmissions across trunks 28 may be subject to public standards or regulations. For example, ANSI standards may govern the PSD used for communications across trunks 28. Typically, public standards and regulations define PSDs that are, in effect, a "lowest common denominator," supporting communications across a variety of networks under many different circumstances. As a result, PSDs defined by public standards and regulations may be substantially inefficient, providing, for example, substantially low bit rates in comparison with that which may be achieved in an optimized configuration. Public standards or regulations may govern transmissions across trunks 28 for any valid reason. For example, system 10 may exclude PBX 14, resulting in a direct connection between upstream splitters 30 and PSTN 20 and transmissions across trunks 28 may be required to comply with standards governing communications with PSTNs.

Switch 12 may provide an interface between system 10 and WAN 22 or other suitable data network. Switch 12 may be a DSL access multiplexer (DSLAM) unit or other device for routing or aggregating data traffic communicated between WAN 22 and PCs 18. In one embodiment, switch 12 is a very high speed DSL (VDSL) switch. Switch 12 may include one or more ports 32 coupling switch 12 with switch links 34. For example, port 32a may couple switch 12 with switch link 34a, which provides a link between switch 12 and PC 18a, along with trunk 28a. Switch 12 may operate in regulated spectra environments and in unregulated spectra environments. In a regulated spectra environment, switch 12 may communicate with CPE devices 24 using a PSD that complies with applicable standards or regulations. In an unregulated spectra environment, switch 12 may communicate with CPE devices 24 using non-compliant PSDs, which may vary from trunk-to-trunk and may be individually optimized for each line coupling CPE devices 24 with switch 12. Reference to line is meant to encompass the physical link between switch 12 and a CPE device 24, which may include a switch link 34, an upstream splitter 30, a trunk 28, and a downstream splitter 26. In one embodiment, the parameters of different modes may be stored by switch 12, such that a network administrator may optimize a line by picking from a set of modes for communication between switch 12 and CPEs 24.

Figure 2:
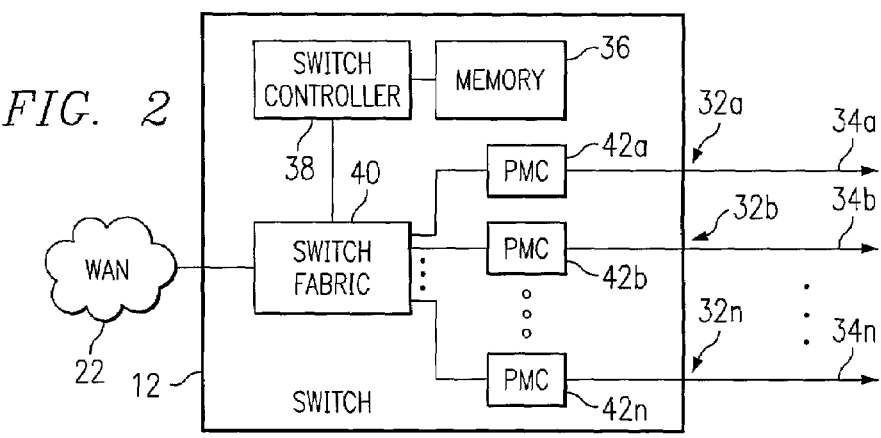
FIG. 2 illustrates an exemplary switch.

FIG. 2 illustrates an exemplary switch 12. Switch 12 may include memory 36, switch controller 38, switch fabric 40, and physical media controllers (PMCs) 42. Memory 36, described more fully below in connection with switch controller 38, may contain information used by switch controller 38 to establish communication links between CPE devices 24 and switch 12. Switch fabric 40 may provide an internal switching infrastructure linking WAN 22, switch controller 38, and PMCs 42. PMCs 42, also described more fully below, generally provide a physical-layer interface between switch fabric 40 and switch links 34.

In general, switch controller 38 controls the operation of switch 12. When a CPE device 24 is coupled to switch 12, switch controller 38 may receive control packets from CPE device 24 notifying switch controller 38 of the network presence of CPE device 24. Such control packets may include, for example, framed "sync" messages communicated using reduced quadrature amplitude modulation (QAM). In this way, the VDSL chipsets may actively try to achieve link with a suitable device that may be able to receive messages from CPE device 24. Switch controller 28 may set up links between CPE devices 24 and switch 12. Reference to link in this context is meant to include any suitable system enabling communication defined by a particular PSD. In a regulated spectra environment, all links between CPE devices 24 and switch 12 must comply with the applicable standards or regulations. In an unregulated spectra environment, switch controller 38 may set up different links between CPE devices 24 and switch 12 according to particular needs. For example, switch controller 38 may set up a "long line" mode link between switch 12 and CPE 24a and a "short line" mode link between switch 12 and CPE 24b. A long line mode link may be suitable for communication over a line that is approximately 4,000 feet long, and a short line mode link may be suitable for communication over a line that is approximately 2,000 feet long. Switch controller 38 may set up links according to one or more selections made by a network administrator. For example, switch controller 38 may set up a long line mode link between switch 12 and CPE device 24n in response to a network administrator selecting long line mode for communication between switch 12 and CPE device 24n. Switch controller 38 may also set up a link between switch 12 and each CPE device 24 in system 10 that complies with a particular standard or set of standards in response to a network administrator selecting such a mode. The mode selected by a network administrator for communication over a particular line may be referred to as the desired mode for communication over the line. In one embodiment, network administrators may select from a set of modes provided by the vendor or manufacturer of the switch or create their own modes for communication between switch 12 and CPE devices 24. Switch controller 38 may determine the desired mode for communication over a line by accessing the profile for the port coupling switch 12 with the line. Port profiles may be stored in memory 36 coupled to switch controller 38 and modified by network administrators as needed. A particular port profile may contain information reflecting the desired mode for a line that may be supported by the corresponding port. Memory 36 may also contain information reflecting a "high probability" mode, described more fully below, which may be used for communication between switch 12 and CPE devices 24 for setting up desired mode links.

As described above, transmissions across trunks 28 are not constrained by public standards in an unregulated spectra environment, and the PSDs for transmissions across trunks 28 may vary from trunk 28 to trunk 28 to optimize the transmission of data across trunks 28. In contrast, transmissions across each trunk 28 in a regulated spectra environment may be required to comply with one or more public standards or regulations, which may restrict transmissions across all trunks 28 to a single PSD complying with the applicable public standards or regulations. Accordingly, when switch 12 is set for operation in a regulated spectra environment (by a network administrator or otherwise) switch controller 38 may automatically configure each port 32 of switch 12 to use a particular PSD complying with the applicable public standards or regulations for communications with CPE devices 24. In this way, switch 12 may communicate with all CPE devices 24 using a particular standards-compliant PSD in a regulated spectra environment, but may communicate with different CPE devices 24 using different PSDs in an unregulated environment.

To establish a desired mode link between a switch 12 and a CPE device 24, switch controller 38 may modify some of control registers 44, 46, and 48 within PMC 42 supporting the line between switch 12 and CPE Device 24 to reflect the parameters of the desired mode. A mode may be defined by six or more parameters, including the following: the upper and lower frequency limits for downstream traffic; the upper and lower frequency limits for upstream traffic; and the power levels for transmissions within those frequency ranges. As an example, switch controller 38 may modify registers 44, 46, and 48 within PMC 42a to establish a desired mode link between switch 12 and CPE device 24a. Switch controller 38 may also modify registers 50, 52, and 54 within CPE devices 24 to establish desired modes links by communicating control packets to CPE devices 24. For example, switch controller 38 may communicate to CPE device 24a control packets containing information reflecting the desired mode parameters which CPE device 24a may use to modify registers 50, 52, and 54 within CPE device 24a accordingly.

When a link goes down, control processor 38 may modify registers 44, 46, and 48 within PMC 42 supporting the link to reflect high-probability mode, described more fully below. A link may go down when, for example, there is a discontinuity in the line supporting the link, which may be caused by a physical break in the line. In one embodiment, switch controller 38 may wait a predetermined amount of time, such as thirty seconds, after a link has gone down before modifying registers 44, 46, and 48 to reflect high-probability mode. In this way, a desired mode for communication across a link does not have to be re-established if the link goes down for less than the predetermined amount of time. Switch controller 38 may access an internal or external timer to determine the amount of time that has passed since a link has gone down.

FIG. 3 illustrates an exemplary PMC 42. PMC 42 may include modulator 56, demodulator 58, frequency generator 60, and PMC controller 62. Modulator 56 receives data from switch fabric 40, encodes that data for transmission across the line coupling switch 12 with CPE device 24 supported by PMC 24, and communicates that data downstream across switch link 34 to CPE device 24. The signal power output of modulator 56 may be determined by mode parameter information stored in register 44. For example, modulator 56 may transmit downstream data at power levels between minus one hundred decibels per hertz (dBm/Hz) and minus fifty dBm/Hz if register 44 contains parameter information reflecting that range. The signal frequency output of modulator 56 may be set by frequency generator 60, which communicates a frequency signal to modulator 56. Demodulator 58 may receive data from CPE devices 24, decode that data for communication to switch fabric 40, and communicate that data to switch fabric 40 for communication to switch controller 38 or WAN 22. Demodulator 58 may decode data using information reflecting the current mode for communication between switch 12 and CPE device 24 stored in register 46 and the frequency signal communicated to demodulator 58 by frequency generator 60. Frequency generator 60 may generate frequency signals that may be used by modulator 56 and demodulator 58 to encode and decode transmissions across lines between switch 12 and CPE devices 12. PMC controller 62 may receive control messages from switch controller 38 and modify registers 44, 46, and 48 in modulator 56, demodulator 58, and frequency generator 60, respectively, to reflect the desired mode for communication between switch 12 and CPE device 24. Registers 44, 46, and 48, may also be modified to store parameters defining a high-probability mode.

FIG. 4 illustrates an exemplary CPE device 24. Exemplary CPE device 24 may include modulator 64, demodulator 66, frequency generator 68, CPE controller 70, and memory 72. Modulator 64 receives data from PC 18, encodes that data for transmission across the line coupling CPE device 24 with switch 12, and communicates that data upstream to switch 12. Similar to PMC modulator 56, the signal power output of modulator 64 may be determined by mode parameter information stored in register 50, and the signal frequency output of modulator 64 may be set by frequency generator 68, which communicates a frequency signal to modulator 64. Demodulator 66 receives data from switch 12, decodes that data for communication to PC 18, and communicates that data downstream to PC 18. Demodulator 66 may decode data using information about the current mode for communication between switch 12 and CPE device 24 stored in register 52 and a frequency signal communicated to demodulator 66 by frequency generator 68. Frequency generator 68 generates frequency signals that may be used by modulator 64 and demodulator 66 to encode and decode transmissions across the line between switch 12 and CPE device 24. Frequency generator 68 contains register 54 for generating the appropriate frequency signals according to the current mode for communication between switch 12 and CPE device 24. CPE controller 70 may receive control messages from switch controller 38 and modify registers 50, 52, and 54 to reflect the desired mode for communication between switch 12 and CPE device 24. Registers 50, 52, and 54 may also be modified to reflect high-probability mode parameters, which may be stored in CPE memory 72. CPE memory 72 may include a read-only memory (ROM) device, such as an electrically erasable programmable ROM (EEPROM), containing information reflecting high-probability mode parameters.

When a desired mode link goes down, CPE controller 70 may reset registers 50, 52, and 54 to high-probability mode. CPE controller 70 may wait a predetermined amount of time, such as thirty seconds, after a desired mode link has gone down before resetting registers 50, 52, and 54. Similar to switch controller 62, CPE controller may access an internal or external timer to determine the amount of time that has passed since a link has gone down.

Figure 5B:
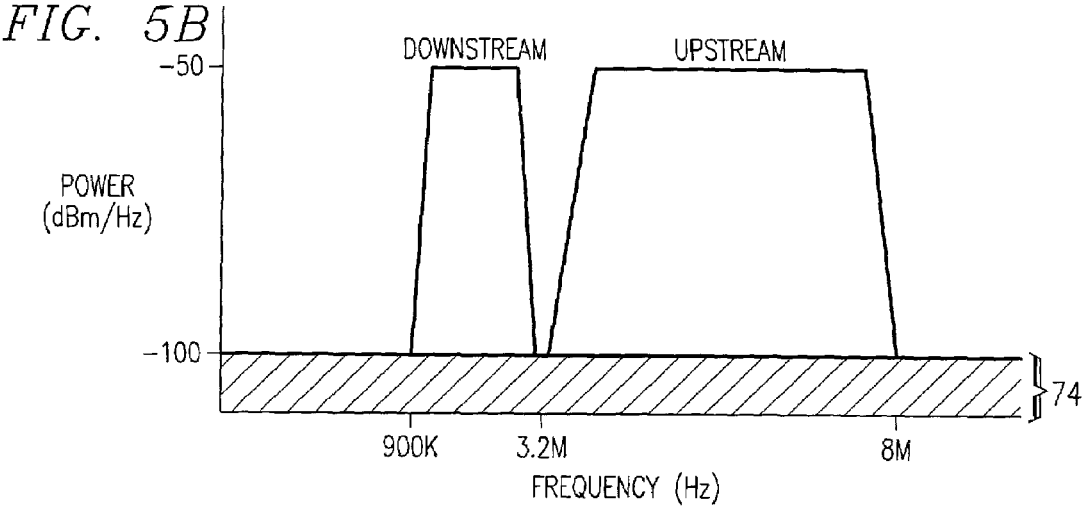

FIGS. 5A through 5D illustrate various PSDs for communication between switch 12 and CPE devices 24. FIG. 5A illustrates a PSD that may be used for communication between switch 12 and CPE devices 24 in a regulated spectra environment where communications across trunks 28 are governed by ANSI T1E1.4 standards. In this example, downstream data is communicated at frequencies between nine hundred kilohertz and three thousand four hundred kilohertz and at power levels between minus fifty dBm/Hz and minus one hundred dBm/Hz. Upstream data is communicated at frequencies between four megahertz and five thousand two hundred fifty kilohertz, also at power levels between minus fifty and minus one hundred dBm/Hz. Downstream and upstream data may be received at a power level low than that transmitted due to attenuation over the line, which may vary according to line length and cable characteristics. Data received at power levels below minus one hundred forty dBm/Hz may be unretrievable due to noise. Accordingly, a "noise floor" exists at minus one hundred forty dBm/Hz, and the PSD illustrated in FIG. 5A excludes area 74. The area between the received PSD and the noise floor may govern the rate at which data may be transported across the link.

Figure 5C:
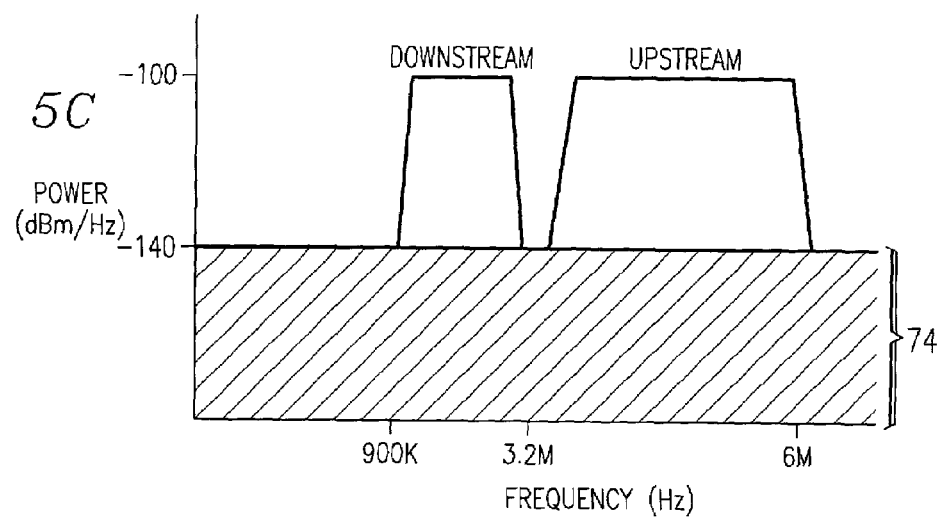

FIG. 5B illustrates a PSD that may be used for communications between switch 12 and CPE devices 24 in an unregulated spectra environment across substantially short lines. A short line may, for example, be approximately two thousand feet long or shorter. Downstream traffic may be transmitted at frequencies between nine hundred kilohertz and three thousand two hundred kilohertz. Upstream traffic may be transmitted at frequencies between three thousand two hundred kilohertz and eight megahertz. Both upstream and downstream traffic may be transmitted at power levels between minus fifty dBm/Hz and minus one hundred dBm/Hz. For a short line, the received PSD is substantially the same as the transmitted PSD. FIG. 5C illustrates a PSD as received at the end of substantially long lines, corresponding to transmissions depicted in FIG. 5B. The received power in this case may be minus one hundred dBm/Hz. Thus, the area shown above the noise floor, which is the area available for noise communication, is much smaller than that for short lines. In order to optimize transmissions across long lines, CPE devices 24 may use a modulation requiring a lower signal to noise ratio. Also, CPE devices 24 may lower the maximum frequency for transmissions as the high frequency signals suffer greater attenuation.

Figure 5D:
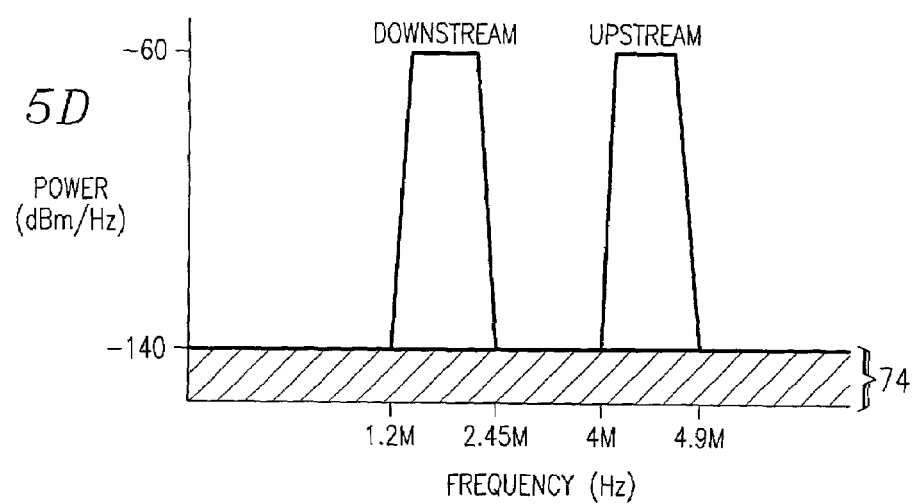

FIG. 5D illustrates a "high-probability" PSD that may be used for initial communications between switch 12 and CPE devices 24. High-probability mode may be a default mode used for communications between switch 12 and CPE devices 24 for establishing links in desired modes. In one embodiment, high-probability mode may be used for communications in any environment and complies with all standards that may govern transmissions across trunks 28. The chances of establishing a link in high-probability mode may be greater than in other modes, but the rate of transmission across a high-probability mode link may be lower.

FIGS. 6A through 6D illustrate exemplary methods for establishing and maintaining links in desired modes between switch 12 and CPE devices 24.

FIG. 6A illustrates an exemplary method for establishing a link between switch 12 and a CPE device 24 in a desired mode. The method begins at step 100 where CPE device 24 is physically coupled to switch 12. This may occur when, for example, CPE device 24 is first connected to trunk 28 supporting communication between switch 12 and CPE device 24. At step 102, switch 12 communicates control packets with CPE device 24 in high-probability mode requesting a high-probability mode link with CPE device 24. CPE device 24 communicates, at step 104, control packets to switch 12 in high-probability mode to make its presence on the line known to switch 12. As described above, these control packets may include, for example, framed "sync" messages communicated using reduced quadrature amplitude modulation (QAM). In this way, the VDSL chipsets may actively try to achieve link with a suitable device that may be able to receive messages from CPE device 24. In one embodiment, switch 12 continuously "listens" for CPE devices 24 and may detect CPE devices 24 when they are coupled to switch 12. Switch 12 receives the control packets from CPE device 24 at step 106 and determines, at step 108, whether a high-probability mode link has been established between switch 12 and CPE device 24. If a high-probability mode link has not been established, switch 12 waits, at step 110, to receive from CPE device 24 control packets communicated in high-probability mode. If a link has been established, the method proceeds to step 112, where switch controller 38 accesses the port profile for port 32 coupling switch 12 with CPE device 24 to determine the desired mode for communication between switch 12 and CPE device 24. After determining the desired mode for communication, switch controller 38 communicates to CPE controller 70 control packets containing the desired mode parameters for communication between switch 12 and CPE device 24 at step 114. CPE controller 70 then receives the control packets at step 116 and modifies registers 50, 52, and 54 to reflect the desired mode parameters for communication between switch 12 and CPE device 24 at step 116. At step 118, switch controller 38 modifies PMC registers 44, 46, and 48 to reflect the desired mode parameters for communication between switch 12 and CPE device 24. Switch 12 then attempts, at step 120, to establish a link with CPE device 24 in the desired mode. Switch 12 may accomplish this by communicating packets with CPE device 24 in the desired mode. If a desired mode link is established at step 122, switch 12 and CPE device 24 start communicating data in the desired mode at step 124, and the method ends. If a desired mode link is not established at step 122, CPE device 24, at step 126, waits thirty seconds from the time registers 50, 52, and 54 were modified for the desired mode link to be established. In one particular embodiment, CPE device 24 may wait thirty seconds from the time PMC registers 44, 46, and 48 are modified to reflect the desired mode parameters. If the desired mode link is not established within that time, CPE controller 70 resets registers 50, 52, and 54 to reflect high-probability mode parameters. In this way, CPE device 24 resets itself to high-probability mode if a desired mode link is not established within a set amount of time. Similarly, switch controller 38 waits, at step 130, thirty seconds from the time registers 44, 46, and 48 in PMC 42 coupling CPE device 24 with switch fabric 40 are modified for the desired mode link to be established. If thirty seconds pass without a desired mode link being established, the method proceeds to step 132 where switch controller 38 modifies registers 44, 46, and 48 to reflect high-probability mode parameters. In this way, switch 12 and CPE device 24, after having been unable to establish a desired mode link, reset themselves to communicate in high-probability mode to try again to establish a desired mode link. In a particular embodiment, CPE device 24 and switch 12 may use the same thirty-second timer, which may begin to run substantially immediately after step 118, to determine when to reset their respective registers. Accordingly, the method proceeds to step 134, where CPE device 24 communicates control packets to switch 12 to request switch 12 to establish a high-probability link between switch 12 and CPE device 24. The method then proceeds to step 104, where switch 12 and CPE device 24 attempt to establish the desired mode link for communication.

FIG. 6B illustrates an exemplary method for reacquiring a desired mode link that has gone down. As described above, a link may go down when there is a discontinuity in the line coupling switch 12 with CPE device 24. The method begins at step 136, where the desired mode link between switch 12 and CPE device 24 goes down. The system administrator is notified, at step 138, by switch 12 that the desired mode link has gone down, and switch 12 attempts, at step 140, to reacquire the desired mode link. Switch 12 may attempt to reacquire a desired mode link by communicating with CPE device packets in desired mode. At step 142, if the desired mode link is reacquired, switch 12 and CPE device 24 resume communication in the desired mode at step 144, and the method ends. If, however, the desired mode link is not reacquired, the method proceeds to step 146, where CPE device 24 and switch 12 wait thirty seconds from the time the desire mode link went down. As described above, switch controller 38 and CPE controller 70 may each contain timers for determining the amount of time that has passed since a link has gone down. After 30 seconds have passed, switch controller 38 modifies registers 44, 46, and 48 in PMC 42 coupling switch 12 with CPE device 24 to reflect high-probability mode parameters.

Similarly, at step 150, CPE controller 70 modifies registers 50, 52, and 54 to reflect high-probability mode parameters. Once CPE device 24 and switch 12 have reset to high-probability mode, the method proceeds to step 102 in FIG. 6A, where CPE device 24 and switch 12 attempt to establish a link in the desired mode.

Figure 6C:
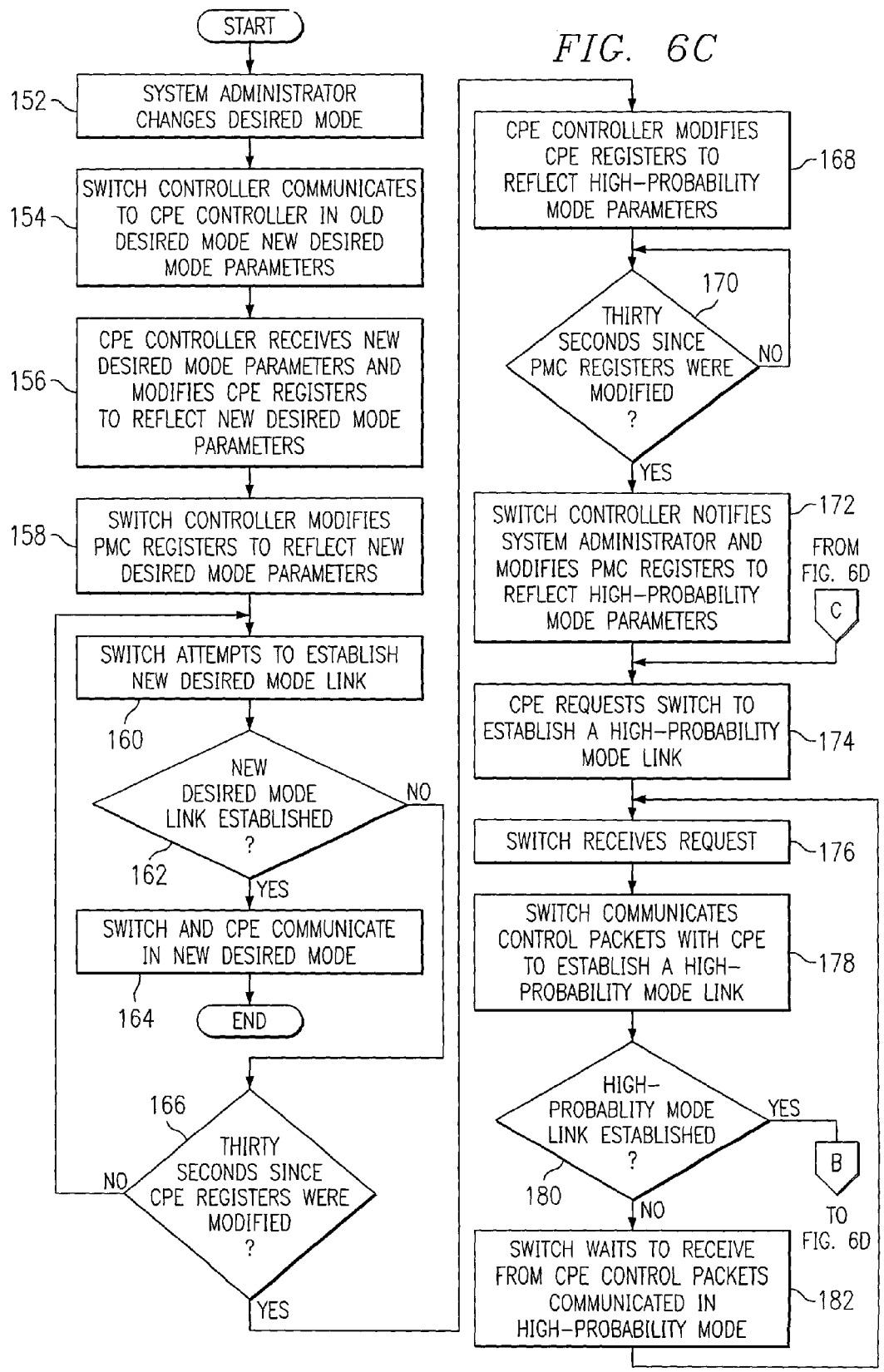
Figure 6D:
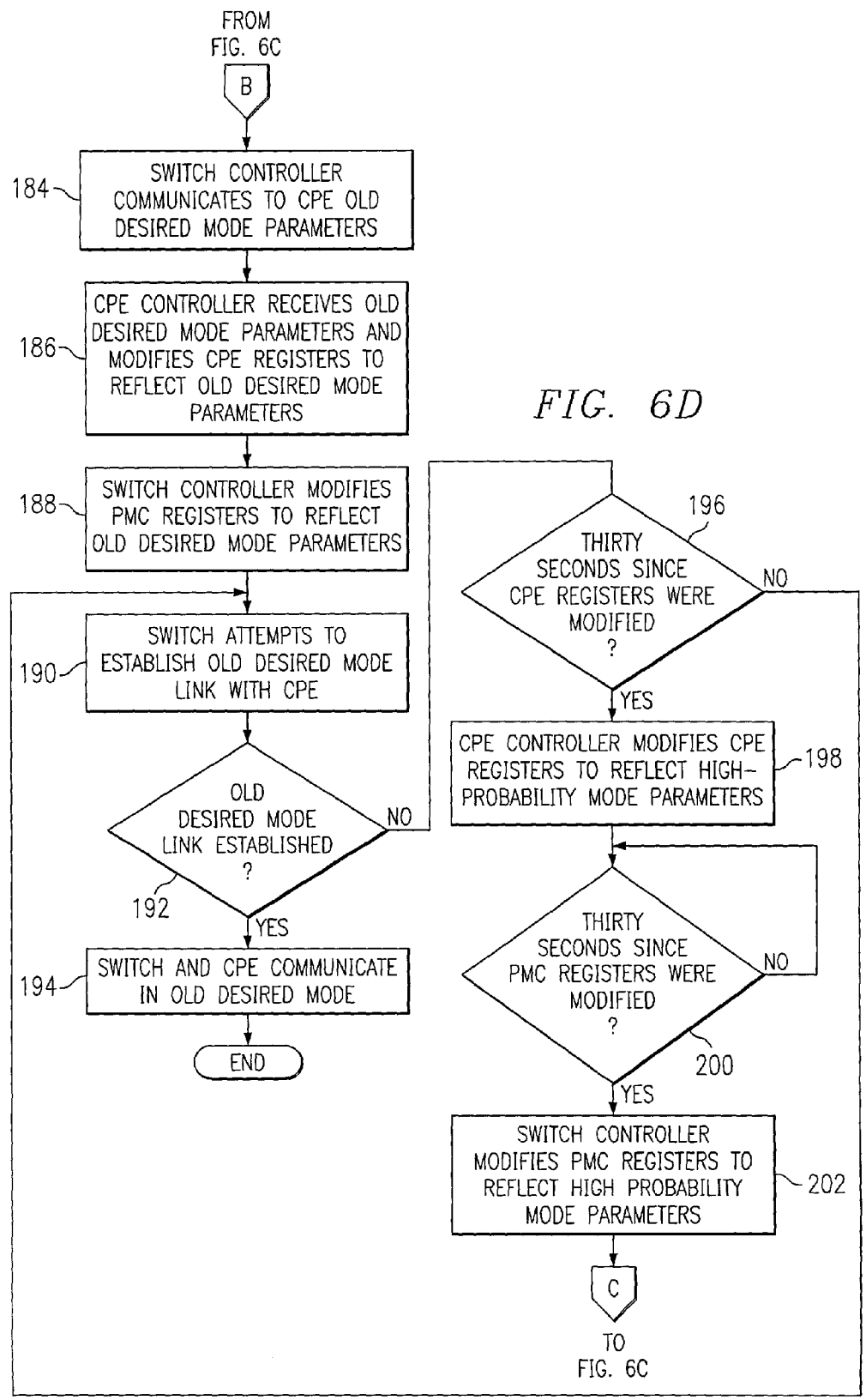

FIGS. 6C and 6D illustrates an exemplary method for changing a link from one desired mode to another. The method begins at step 152, where a system administrator changes the desired mode for communication between switch 12 and a CPE device 24. Switch controller then communicates, at step 154, to CPE controller 70 in the old desired mode control packets containing the desired mode parameters for communication between switch 12 and CPE device 24. CPE controller 70 then receives the control packets at step 156 and modifies registers 50, 52, and 54 to reflect the new desired mode parameters. At step 158, switch controller 38 also modifies registers 44, 46, and 48 and PMC 42 coupling CPE device 24 with switch fabric 40 to reflect the new desired mode parameters. After these registers have been modified, switch 12 attempts to establish a link with CPE device 24 in the new desired mode at step 160. If a desired mode link is established at step 162, the method proceeds to step 164, where switch 12 and CPE device 24 begin communicating in the new desired mode, and the method ends. If, however, the desired mode link is not established at step 162, the method proceeds to step 166, where CPE controller 70 waits thirty seconds from the time registers 50, 52, and 54 are modified for the new desired mode link to be established. If thirty seconds pass without the desired mode link being established, CPE controller 70 modifies, at step 168, registers 50, 52, and 54 to reflect high-probability mode parameters. In this way, when a predetermined amount of time elapses without a new desired mode link being established, CPE device 24*a* resets itself to high-probability mode. At step 170, switch controller 38 also waits thirty seconds from the time registers 44, 46, and 48 in PMC 42 coupling CPE device 24 with switch fabric 40 are modified for the new desired mode link to be established. Likewise, if thirty seconds pass without the new desired mode link being established, switch controller 38 notifies the system administrator that the new desired mode link has not been established and modifies registers 44, 46, and 48 in PMC 42 coupling CPE device 24 with switch fabric 40 to reflect high-probability mode parameters at step 172. Once PMC 42 and CPE device 24 have been reset to communicate in high-probability mode, CPE device 24 communicates, at step 174, control packets to switch 12 to request switch 12 to establish a high-probability mode link between switch 12 and CPE device 24. As described above, these control packets may include, for example, framed "sync" messages communicated using reduced quadrature amplitude modulation (QAM). In this way, the VDSL chipsets may actively try to achieve link with a suitable device that may be able to receive messages from CPE device 24. At step 176, switch 12 receives the control packets from CPE device 24 and, at step 178, communicates control packets with CPE device 24 in high-probability mode to establish a high-probability mode link with CPE device 24.

At step 180, if a high-probability mode link is not established between switch 12 and CPE device 24 the method proceeds to step 182, where switch 12 waits to receive from CPE device 24 control packets communicated in high-probability mode. If a high-probability mode link is established at step 180 between switch 12 and CPE device 24, the method proceeds to step 184, where switch controller 38 communicates to CPE controller 70 control packets containing the old desired mode parameters for communication between switch 12 and CPE device 24. (Alternatively, switch controller 38 may re-try to establish the new desired mode link one or more times.) CPE controller 70 then receives, at step 186, the control packets and subsequently modifies registers 50, 52, and 54 to reflect the old desired mode parameters for communication between switch 12 and CPE device 24. Switch controller 38 then modifies registers 44, 46, and 48 in PMC 42 coupling CPE device 24 with switch fabric 40 to reflect the old desired mode parameters at step 188. After switch 12 and CPE device 24 have been reset to communicate in the old desired mode, switch 12 attempts, at step 190, to establish a link with CPE device 24 in the old desired mode. At step 192, if the old desired mode link is established, the method proceeds to step 194, where switch 12 and CPE device 24 begin communicating in the old desired mode, and the method ends. If, however, the old desired mode link is not established at step 192, the method proceeds to step 196, where CPE device 24 waits thirty seconds from the time registers 50, 52, and 54 were modified for the old desired mode link to be established. If thirty seconds pass without the old desired mode link being established, CPE controller 70 resets registers 50, 52, and 54 to reflect high-probability mode parameters at steps 196 and 198. Switch controller 38 also waits thirty seconds from the time PMC registers 44, 46, and 48 were modified for the old desired mode link to be established at step 200. If thirty seconds pass from the time registers 44, 46, and 48 are modified to reflect the old desired mode without the old desired mode link being established, the method proceeds to step 202, where switch controller 38 modifies registers 44, 46, and 48 in PMC 42 coupling CPE device 24 with switch fabric 40 to reflect high-probability mode parameters. After switch 12 and CPE device 24 have been reset to communicate in high-probability mode, the method proceeds to step 174, where switch 12 and CPE device 24 attempt to establish a high-probability mode link before establishing a link in the old desired mode.

The invention described herein provides numerous advantages over the prior art. For example, the present invention provides for greater flexibility in configuring links between switch 12 and CPE devices 24. Switch 12 may support data communication in multiple power spectra, may support communication in both regulated spectra and unregulated spectra environments, may communicate with different CPE devices 24 using different PSDs, and may communicate using "custom" PSDs defined by network administrators. Additionally, links may be individually optimized in an unregulated spectra environment to maximize bit rates and minimize data loss across communication lines. The present invention also provides compatibility with existing data networks and provides for robust links between switch 12 and CPE devices 24 in that switch 12 may reacquire links that have gone down without intervention by network administrators.

Although the present invention has been described with one embodiment, divers changes, variations, alterations, transformations, and modifications may be suggested to one skilled in the art, and it is intended that the present invention encompass such changes, variations, alterations, transformations, and modifications as fall within the scope and spirit of the appended claims.

What is claimed is:

1. A system for communicating data, comprising:
   a data switch coupled to one or more customer premises equipment (CPE) devices;
   the data switch comprising software embodied in a computer readable medium operable to:
   communicate with the one or more CPE devices using a first predetermined power spectral density (PSD);

communicate with the one or more CPE devices using a second predetermined PSD; and automatically select one of the first predetermined PSD and the second predetermined PSD that will establish a link to the one or more CPE devices when a user selects another one of the first predetermined PSD and the second predetermined PSD that will not establish a link to the one or more CPE devices.

2. The system of claim 1, wherein the data switch is further operable to communicate substantially simultaneously with two or more CPE devices using at least two different PSDs.

3. The system of claim 1, wherein the data switch is further operable to direct a CPE device to communicate with the data switch using a particular PSD.

4. The system of claim 3, wherein the data switch directs the CPE device by communicating control packets containing one or more parameters defining one or more characteristics of the particular PSD to the CPE device.

5. The system of claim 1, wherein the first predetermined PSD is substantially optimal for communication across a line coupling the data switch with a CPE device, the line experiencing substantially high levels of noise.

6. The system of claim 1, wherein the first predetermined PSD is substantially optimal for communication across a line coupling the data switch with a CPE device, the line experiencing substantially low levels of noise.

7. The system of claim 1, wherein the first predetermined PSD is substantially optimal for communication across a line coupling the data switch with a CPE device, the line experiencing substantially high signal attenuation.

8. The system of claim 1, wherein the second predetermined PSD complies with at least one public standard.

9. The system of claim 1, wherein the data switch is further operable to communicate with the one or more CPE devices using a high-probability PSD characterized by a substantially high probability of supporting communication and a substantially low bit rate, the high-probability PSD being substantially within the intersection of a plurality of PSDs complying with a plurality of public standards.

10. The system of claim 9, wherein the data switch communicates with the one or more CPE devices using the high-probability PSD to establish a particular PSD for communication between the switch and the one or more CPE devices.

11. The system of claim 1, wherein the data switch is further operable to communicate with the one or more CPE devices using a PSD defined by a network administrator.

12. The system of claim 1, wherein:
the data switch comprises memory operable to store one or more parameters defining particular characteristics of one or more PSDs; and
the data switch is further operable to communicate with the one or more CPE devices using a PSD selected by a network administrator from a list of the one or more PSDs the parameters of which are stored in the memory.

13. The system of claim 1, wherein the data switch uses frequencies in the very high speed digital subscriber line (VDSL) band.

14. The system of claim 1, wherein the data switch is further operable to automatically communicate with all of the CPE devices coupled to the data switch using a predetermined PSD that complies with at least one public standard in response to a switch administrator setting the switch for operation in a regulated spectra environment.

15. A system for communicating data, comprising:
a data switch coupled to one or more customer premises equipment (CPE) devices;
the data switch comprising software embodied in a computer readable medium and a physical media controller (PMC) operable to:
communicate with the one or more CPE devices using a first predetermined power spectral density (PSD) that conforms to a public standard;
communicate with the one or more CPE devices using a second predetermined PSD that does not conform to a public standard; and
automatically select one of the first predetermined PSD and the second predetermined PSD that will establish a link to the one or more CPE devices when a user selects another one of the first predetermined PSD and the second predetermined PSD that will not establish a link to the one or more CPE devices;
the PMC further comprising one or more memory registers operable to select the PSD.

16. The system of claim 15, wherein the data switch is further operable to communicate substantially simultaneously with two or more CPE devices using at least two different PSDs.

17. The system of claim 15, wherein the data switch is further operable to direct a CPE device to communicate with the data switch using a particular PSD.

18. The system of claim 16, wherein the data switch directs the CPE device by communicating control packets containing one or more parameters defining one or more characteristics of the particular PSD to the CPE device.

19. The system of claim 15, wherein the first predetermined PSD is substantially optimal for communication across a line coupling the data switch with a CPE device, the line experiencing substantially high levels of noise.

20. The system of claim 15, wherein the first predetermined PSD is substantially optimal for communication across a line coupling the data switch with a CPE device, the line experiencing substantially low levels of noise.

* * * * *